United States Patent
Rowe et al.

(10) Patent No.: US 10,783,214 B1
(45) Date of Patent: Sep. 22, 2020

(54) ADAPTIVE AND DYNAMIC USER INTERFACE WITH LINKED TILES

(71) Applicant: Palantir Technologies Inc., Palo Alto, CA (US)

(72) Inventors: Ryan Rowe, Portola Valley, CA (US); Hanna Kim, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 263 days.

(21) Appl. No.: 15/980,415

(22) Filed: May 15, 2018

Related U.S. Application Data

(60) Provisional application No. 62/640,497, filed on Mar. 8, 2018.

(51) Int. Cl.
| | |
|---|---|
| G06F 3/0482 | (2013.01) |
| G06F 16/957 | (2019.01) |
| G06F 16/954 | (2019.01) |
| G06F 16/9535 | (2019.01) |

(52) U.S. Cl.
CPC ........ G06F 16/9577 (2019.01); G06F 3/0482 (2013.01); G06F 16/954 (2019.01); G06F 16/9535 (2019.01)

(58) Field of Classification Search
CPC ...... G06F 3/048; G06F 3/0482; G06F 3/0484; G06F 17/30; H04L 67/02
See application file for complete search history.

(56) References Cited

U.S. PATENT DOCUMENTS

| | | | |
|---|---|---|---|
| 5,515,488 A | 5/1996 | Hoppe et al. | |
| 8,498,985 B2 * | 7/2013 | Spence | G06F 9/453 |
| | | | 707/737 |
| 9,367,872 B1 * | 6/2016 | Visbal | G06F 3/0482 |
| 9,686,086 B1 | 6/2017 | Nguyen et al. | |
| 2008/0201748 A1 | 8/2008 | Hasek et al. | |
| 2009/0007101 A1 | 1/2009 | Azar et al. | |
| 2013/0275381 A1 | 10/2013 | De Schrijvr et al. | |
| 2014/0053091 A1 | 2/2014 | Hou et al. | |
| 2014/0280056 A1 | 9/2014 | Kelly | |
| 2014/0282160 A1 * | 9/2014 | Zarpas | G06F 16/9038 |
| | | | 715/769 |
| 2014/0282163 A1 * | 9/2014 | MacKinlay | G06F 16/904 |
| | | | 715/769 |

(Continued)

OTHER PUBLICATIONS

Brooks et al., "Hoptrees: Branching History Navigation for Hierarchies," Sep. 2, 2013, Network and Parallel Computing, pp. 316-333.

(Continued)

*Primary Examiner* — Xiomara L Bautista
(74) *Attorney, Agent, or Firm* — Knobbe, Martens, Olson & Bear, LLP

(57) ABSTRACT

Browser-based, performant interactive user interface can allow a user to perform filtering of data via a browser application, and process millions of data cells that are loaded into the browser. The interactive user interface can be customized and optimized for a classification of users with regular behavior patterns, for example, by displaying a plurality of tiles depicting a subset of data associated with a plurality of data objects. Moreover, a user can select portions of data within an individual tile and propagate the selection automatically through all remaining tiles on the interactive user interface.

20 Claims, 7 Drawing Sheets

(56) References Cited

U.S. PATENT DOCUMENTS

| | | |
|---|---|---|
| 2015/0324371 A1 | 11/2015 | Guo |
| 2015/0339373 A1* | 11/2015 | Carlson ................. G06F 16/287 |
| | | 707/737 |
| 2016/0134723 A1 | 5/2016 | Gupta et al. |
| 2017/0052654 A1* | 2/2017 | Cervelli .................... G06F 3/14 |
| 2017/0206372 A1 | 7/2017 | Jung |
| 2017/0214889 A1* | 7/2017 | Maciejewski .......... H04N 7/181 |
| 2017/0262196 A1 | 9/2017 | Hirose |

OTHER PUBLICATIONS

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Zaharia et al., "Resilient Distributed Datasets: A Fault-Tolerant Abstractions for In-Memory Cluster Computing," Proceedings of the 9th USENIX Conference on Networked Systems and Design and Implementation, 2012, 14 pages.

* cited by examiner

ADAPTIVE AND DYNAMIC USER INTERFACE WITH LINKED TILES

RELATED APPLICATIONS

The present application is claims priority under 35 U.S.C. § 119(e) to U.S. Provisional Application No. 62/640,497, filed Mar. 8, 2018, which is hereby incorporated herein by reference in its entirety to be part of this specification.

TECHNICAL FIELD

The present disclosure relates to systems, techniques, databases, and user interfaces for data integration, analysis, visualization, and interaction.

BACKGROUND

Current solutions for data analysis typically include servers and interfaces designed for processing large volumes of data. For example, large scale, multicomputer datacenters, which host large quantities of data, may perform an advanced distribution of tasks in response to user commands to manipulate the large quantities of data. This can include dividing the command into tasks, allocating the tasks to available processors in the data center most suited for the tasks, communicating with the processors, and coordinating results. Although this may greatly increase the speed of processing large amounts of data, each step in the advanced distribution of tasks has an inherent latency. The inherent latency makes the user experience seem slow, especially when the user processes small amounts of data.

Additionally, analysis of data typically involves users with irregular behavior patterns (e.g., users that look for new discoveries in the data with unpredictable analysis techniques). For example, a user may want to find new information from the data that the user may not have been expecting to find when beginning a review of the data. The user may use processes and filters that may be unconventional, unusual, or generally unpredictable or inconsistent with prior analysis techniques utilized by the user previously. With large scale datacenters, the processes are cumbersome and the configuration is inefficient for specialized and repetitive user interactions with the data.

Finally, for example, monitors or screens have limited sizes and resolutions and can only display a limited amount of information.

SUMMARY

A browser-based, performant interactive user interface can allow a user to perform filtering of data via a browser application, and process millions of data cells that are loaded into the browser. Unlike using large datacenters, loading the data into the browser can result in an interface that is quick and responsive with the locally loaded set of data, and which does not require high-powered processors or significant bandwidth for frequent communications with back-end server. Moreover, the user interface can be customized and optimized for a classification of users with regular behavior patterns. According to various embodiments, the system described herein may advantageously present relevant data to a user via a user interface that is dynamically updated on the user's screen so that a user can more efficiently review the information by not have to scroll, zoom, or configure various portions of an interface frequently, for example. According to various embodiments, the system described herein may advantageously have all or a majority of the data a user intends to interact with in an interactive user interface loaded into a browser application so that the user can take advantage of the increased speed in calculating and displaying various interface elements because, for example, there would be no need to download additional data or visualization generation instructions upon each updating of the user interface. Moreover, in some embodiments, certain aspects of the system can be performed by a back-end server which may have additional benefits and advantages, such as, for example, redundancy of data, security, higher level processing, or any other useful implementation.

In some embodiments, the interactive user interface can include a plurality of tiles, where filtering of one tile, or bucketing a portion of the data, can cause every other tile to potentially reformat or reconfigure, if optimal, and to display the filtered data. For example, selecting a subset of data in one tile (e.g., by selecting one or more bars on a histogram, where each bar represents a subset of data), can simultaneously update all other displayed tiles to update in real time to display the selected data in an optimal format. The tiles may update to include the selected data or exclude the data that was not selected (i.e., filtered out). Additionally, the tiles with graphs or charts may be updated to include a different scale on which the selected data is presented, so that the selected data is presented optimally, based on user or default preferences, or for any other purpose. Based on the updates, some tiles may be more or less relevant than before to the user and the ordering of the tiles may be shifted. For example, a tile with only specific data that is filtered out (i.e., not selected), may be hidden from view as being irrelevant due to containing no information anymore. In another example, a tile depicting various shipment sizes (e.g., "Full," "Half," "Oversize," or others) might be less relevant after all the "Oversize" shipments are removed or hidden from the data to be analyzed, and the tile can be moved to a location that is less emphasized in the interactive user interface, such as near the bottom. Accordingly, various implementations, systems and methods of the present disclosure can optimize the screen display space, for example the screen size and resolutions available to a user, by displaying the most relevant information in locations that the user will view first without scrolling, zooming, or reformatting the page or elements on the page. In some embodiments, a tile can also be displayed with a difference shading or color to indicate more or less relevance or importance to a user. It should be appreciated, in some embodiments, the tiles may not automatically update upon the selection of a portion of data in a tile. For example, if a comparator tile is present, the system may allow a user to select data from a tile and be able to add the related data objects to a group. In some embodiments, upon adding data objects to a group, the tiles can then update. Thus, the interactive user interfaces can be programmed to update in any number of ways upon varying conditions (e.g., if one or more tiles are present, different updating preferences may apply).

Additionally, a user can add additional columns with customizable data to the underlying data source to keep track of particular data sets, to contribute instructions or results of an analysis to the data, or for any other reason where a user would like to associate new data with the data source. For example, in some embodiments, this concept is called "Bucketers" or "Buckets," which can allow a user to define a new column to a source of data, and to assign new values to that column for some or all of the data. For example, if a user adds a new column to a source data, and begins populating that column with new data, all relevant tiles may update to reflect the new data as it is input and/or saved into the data set.

Users can also modify and update the memory loaded data, such that any changes to the data, via the interactive user interface, can update the original set of data, get saved and sent directly to relevant users to share throughout a particular group or organization, or create a new updated set of data for reference by the user or specific group of users without modifying the original data source. The interactive user interface may include aggregator and comparator tiles, as well as a variety of bar graphs in individual tiles that can provide filtering, aggregating, and comparing of various subsets of data. Similar to how selecting a portion of data can update all displayed tiles, aggregating various subsets of data can cause all tiles to reformat, if optimal, and to display the data represented by the designated aggregate group(s).

Accordingly, in various embodiments, data is automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. In some embodiments, the system may present a combination of visual representation, such as charts and graphs, and aggregate quantities. The system may also utilize the information to interpolate or extrapolate, e.g., forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems. Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a user can interact with the interactive user interface. The system can detect the user inputs and update one or more portions of the interactive user interface based on the user interactions. For example, a user can select data from one of a plurality of charts of graphs and several other charts or graphs can dynamically update based on the user selection.

In some embodiments, the systems or methods can be configured to access, from a data source, a plurality of data objects that are stored in an electronic database, wherein each of the plurality of data objects can comprise multiple data attributes; generate an interactive user interface for interacting with the plurality of data objects, wherein the interactive user interface can comprise a plurality of tiles configured to display information associated with various data attributes of the plurality of data objects, and wherein at least one of the plurality of tiles is configured to receive a selection of a portion of the tile; receive, electronically via the interactive user interface, a selection of a portion of the at least one of the plurality of tiles; and responsive to receiving the selection of the portion of the at least one of the plurality of tiles: determine a subset of the plurality of data objects represented by the selected portion; and update, in the interactive user interface, the plurality of tiles to display information associated with the subset of the plurality of data objects. In some embodiments, the one tile of the plurality of tiles depicts a visualization of data based at least partly on the plurality of data objects. In some embodiments, the selection is based at least partly on a selection of a portion of the visualization of data. In some embodiments, a current layout of the interactive user interface can be saved in a compatible file format. In some embodiments, the interactive user interface is displayed based at least partly on inputs into a session editor. In some embodiments, the plurality of tiles can comprise visual representations as one or more: a number, a bar graph, a list, a scatter plot, and a bar graph overlaid on a scatter plot. In some embodiments, the plurality of tiles can comprise a filter tile depicting a histogram as a bar chart based at least partly on data associated with at least some of the plurality of data objects. In some embodiments, the filter tile can further comprise settings to group and label one or more data objects, and the creation of a group can further result in the creation of a new column of data for plurality of data objects. In some embodiments, the plurality of tiles can comprise an aggregator tile depicting a single value based at least partly on the subset of the plurality of data objects. In some embodiments, the plurality of tiles can comprise a comparator tile depicting data related to at least two exclusive subsets of the plurality of data objects. In some embodiments, the data objects can pertain to one of shipments of freight, manufacturing, or sensor data.

Additionally, in some embodiments, the systems or methods can be configured to, in response to receiving a selection of the portion of the at least one of the plurality of tiles, updating, in the interactive user interface, the scale shown on the plurality of tiles to display information associated with the subset of the plurality of data objects in an automatically optimized format. The systems or methods can also be configured to receive, electronically via the interactive user interface, updated data associated with one or more of the data objects; and responsive to receiving the updated data, update the subset of the plurality of data objects to display information associated with the updated data. The systems or methods can also be configured to, responsive to receiving the updated data, update the data source comprising the plurality of data objects with the updated data. Also, the systems or methods can be configured to, responsive to receiving updated data, notify one or more users of the update.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Figure 1:
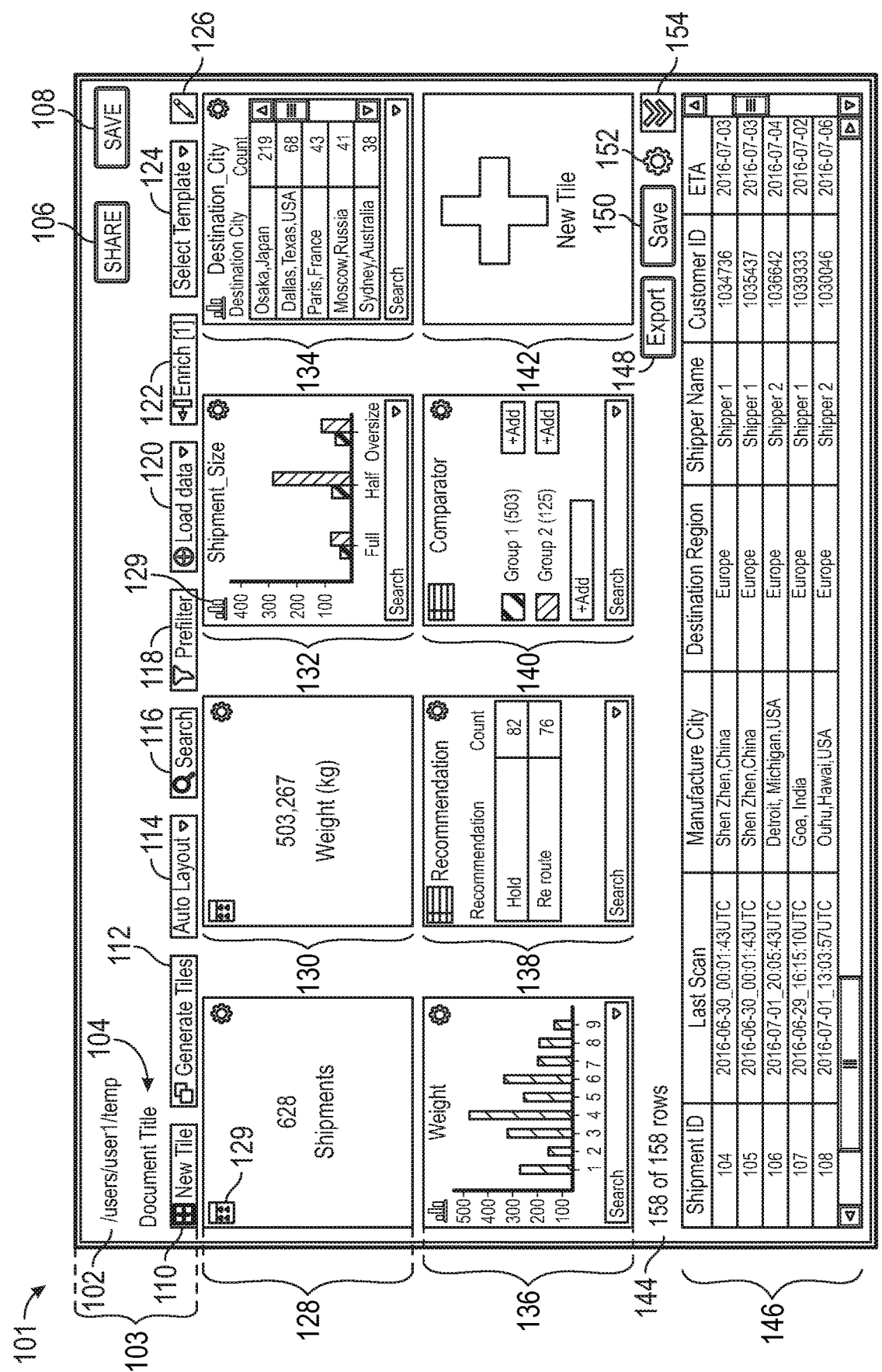
FIG. 1 illustrates an embodiment of an interactive user interface depicting viewable and selectable data, toolbars, and various implementations of selectable and interactive tiles.

Although several embodiments, examples, and illustrations are disclosed below, it will be understood by those of ordinary skill in the art that the disclosure described herein extends beyond the specifically disclosed embodiments, examples, and illustrations and includes other uses of the disclosure and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the disclosures herein described.

Overview

The disclosure herein presents various embodiments of systems, techniques, databases, and user interfaces for data integration, analysis, visualization, and interaction. For example, one embodiment of the system described herein provides the ability for a user to view and interact with one or more data sources through a dynamic and interactive user interface. The system allows a user to select a subset of data in a portion of the interactive user interface and have the system automatically update one or more additional portions of the interactive user interface to display the selected data and in a format or scale that is optimized for the particular user, the selected data, or both. Additionally, the system allows convenient and efficient modifications of the data, allowing a user to amend the original data source, create a new copy of the source data with changes, and to amend a new column, bucket, or dimension to the source data and fill in the column with additional data.

A browser-based, performant interactive user interface can allow a user to perform filtering of data via a browser application, and process millions of data cells that are loaded into the browser. Unlike using large datacenters, loading the data into the browser can result in an interface that is quick and responsive with the locally loaded set of data, and which does not require high-powered processors or significant bandwidth for frequent communications with back-end server. Moreover, the user interface can be customized and optimized for a classification of users with regular behavior patterns. According to various embodiments, the system described herein may advantageously present relevant data to a user, via a user interface, that is dynamically updated on the user's screen so that a user can be more efficient in reviewing the information by not have to scroll, zoom, or configure various portions of an interface frequently, for example. According to various embodiments, the system described herein may advantageously have all or a majority of the data a user intends to interact with in an interactive user interface loaded into a browser application so that the user can take advantage of the increased speed in calculating and displaying various interface elements because, for example, there would be no need to download additional data or visualization generation instructions upon each updating of the user interface. Moreover, in some embodiments, certain aspects of the system can be performed by a back-end server which may have additional benefits and advantages, such as, for example, redundancy of data, security, higher level processing, or any other useful implementation.

In some embodiments, the interactive user interface can include a plurality of tiles, where filtering of one tile, or bucketing a portion of the data, can cause every other tile to potentially reformat or reconfigure, if optimal, and to display the filtered data. For example, selecting a subset of data in one tile (e.g., by selecting one or more bars on a histogram, where each bar represents a subset of data), can simultaneously update all other displayed tiles to update in real time to display the selected data in an optimal format. The tiles may update to include the selected data or exclude the data that was not selected (i.e., filtered out). Additionally, the tiles with graphs or charts may be updated to include a different scale on which the selected data is presented, so that the selected data is presented optimally, based on user or default preferences, or for any other purpose. Based on the updates, some tiles may be more or less relevant than before to the user and the ordering of the tiles may be shifted. For example, a tile with only specific data that is filtered out (i.e., not selected), may be hidden from view as being irrelevant due to containing no information anymore. In another example, a tile depicting various shipment sizes (e.g., "Full," "Half," "Oversize," or others) might be less relevant after all the "Oversize" shipments are removed or hidden from the data to be analyzed, and the tile can be moved to a location that is less emphasized in the interactive user interface, such as near the bottom. These systems and methods can optimize the screen display space, for example the screen size and resolutions available to a user, by displaying the most relevant information in locations that the user will view first without scrolling, zooming, or reformatting the page or elements on the page. In some embodiments, a tile can also be displayed with a difference shading or color to indicate more or less relevance or importance to a user. It should be appreciated, in some embodiments, the tiles may not automatically update upon the selection of a portion of data in a tile. For example, if a comparator tile is present, the system may allow a user to select data from a tile and be able to add the related data objects to a group. In some embodiments, upon adding data objects to a group, the tiles can then update. Thus, each interactive user interface can be programmed to update in any number of ways upon varying conditions (e.g., if one or more tiles are present, different updating preferences may apply).

Additionally, a user can add additional columns with customizable data to the underlying data source to keep track of particular data sets, to contribute instructions or results of an analysis to the data, or for any other reason where a user would like to associate new data with the data source. For example, in some embodiments, this concept is called "Bucketers" or "Buckets," which can allow a user to define a new column to a source of data, and to assign new values to that column for some or all of the data. For example, if a user adds a new column to a source data, and begins populating that column with new data, all relevant tiles may update to reflect the new data as it is input and/or saved into the data set.

Users can also modify and update the memory loaded data, such that any changes to the data, via the interactive user interface, can update the original set of data, get saved and sent directly to relevant users to share throughout a particular group or organization, or create a new updated set of data for reference by the user or specific group of users without modifying the original data source. The interactive user interface may include aggregator and comparator tiles, as well as a variety of bar graphs in individual tiles that can provide filtering, aggregating, and comparing of various subsets of data. Similarly to how selecting a portion of data can update all displayed tiles, aggregating various subsets of data can cause all tiles to reformat, if optimal, and to display the data represented by the designated aggregate group(s).

In some embodiments, the interactive user interface template or user-specific settings may be saved for future use by loading into the browser on the same or a different machine. Thus, the modified interface, which can be further customized by a user, can be saved and accessed at a later time, and shared with other users (for example, by converting to a configuration file and sent to other users). For example, the template or settings may be defined in a YAML configuration file format, which is a human-readable data serialization format that takes concepts from programming languages such as C, Perl, and Python, and ideas from XML and the data format of electronic mail. Because a template is saved based on a set of data objects, when a user loads the template back into the browser, the template may not function properly if the data objects are different (e.g., they have fewer or different columns of data). In some embodiments, configuration file formats other than YAML can be used, for example: JSON, XML, JavaScript, C, Email, PHP, Python, Perl, and/or others. Some solutions to this problem may include, for example: the system and template file can be saved together to prevent compatibility issues, there can be a correlation setting that prevents selection of incompatible data sources or templates, and/or the system can load the template but hide the tiles that pertain to data or columns that were present in the original data source when the template was saved and that are absent from the newly loaded. It is advantageous to be able to load data directly into the browser to speed up the interactions and display speed of various interactive user interface elements as compared to downloading and working on data stored on a remote server, or even a local disk drive in some circumstances. Additionally, a user with an internet or network connection that may be unreliable can continue to work on the data during intermittent connectivity.

The interactive user interface provides increased efficiency via customization based on the classification of the user, the user's role, the data source, or other factors related to any special use case. The customizable features can be pre-configured to be highly optimized for person or job. For example, a logistics manager in a company must go through thousands of orders or shipments and make decisions such as whether to hold or reroute shipments that are intended to be sent to an overloaded warehouse or facility. The interactive user interface may be configured to allow a user to look up shipments by weight, size, location, destination, or other criteria.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Aggregators/Aggregator Tile: An aggregator tile can render a single value computed over a given column of data across a filter set. In some embodiments, Aggregators can update with each filtering interaction. Aggregators can be used by users to monitor sums or averages over certain columns of data while actively filtering the dataset. For example, a user analyzing and filtering stock purchases and sales can track an average transaction value across a currently filtered set of transactions.

Bucket: A user designated subset of data that may also be associated with a particular description specified or programmed by the user. See description of Bucketers for more information.

Bucketers/Bucketer Tile: Bucketers can give a user the ability to define a new column and to assign new values to that column for some or all of the data from one or more data sources. In some embodiments, the Bucketer Tile can render a filter (a chart or table, for example) and combine the filter with actions displayed on a portion of the tile, for example on the bottom of the tile. Once values are assigned to the new column, the associated filter can be used just like any filter to filter the data by the values in the Bucketer column. Bucketers can be pre-configured with values to choose from when assigning, or new values can be created by a user.

Comparator/Comparator Tile: Comparators allow a user to define mutually exclusive subsets of data and compare the subsets across all other tiles presented on an interactive user interface.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a shipment, a market instrument, or other noun. Each data object may be associated with a unique identifier that uniquely identifies the data object. The object's attributes (e.g., metadata about the object) may be represented in one or more properties.

Filter/Filter Tile: A tile that can render a histogram for a given column of data as a bar chart showing a number of frequent values, a table showing some or all values, or through any other visualization. Filters may be applied to data by selecting bars of the bar chart, or selecting rows of the table.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g., a time series), etc.

Property Value: The value associated with a property, which is of the type indicated in the property type associated with the property. A property may have multiple values.

Tile: An area of an interactive user interface that comprises information related to one or more data sources or portion of the one or more data sources. Examples, which are described in further detail herein, can include filter tiles, aggregator tiles, bucketer tiles, and comparator tiles, among others.

Interactive User Interface

FIG. 1 illustrates an example interactive user interface 101 depicting example viewable and selectable data, toolbars, and various implementations of selectable and interactive tiles, in accordance with some embodiments. This description is provided for the purpose of providing an example and is not intended to limit the techniques to the example embodiments described.

Interactive user interface 101 may display information for a plurality of data objects 146. Information related to some or all of the plurality of data objects 146 may also be displayed in one or more example tiles (for example, Aggregator Tiles 128 and 130, Bucketer Tile 138, Filter Tiles 134 and 136, Comparator Tile 140, and Filter Tile with Comparator 132), such that each tile is associated with data related to some or all of one or more sets of data objects loaded into the interactive user interface. The plurality of data objects 146 may be retrieved or obtained by the system or loaded into the system via a source data file. The source data file can be a local file or a file that is stored remotely. Also, it should be appreciated that any number of tiles and any type of tile can be displayed in any number of configurations. It should also be appreciated that in some embodiments, certain tiles may not be configured to appear at the same time as other tiles. For example, once a user defines groups in the Comparator Tile 140, the system may automatically update all other tiles to only display the user defined groups. For example, a user can select data in another tile, and without updating all tiles based on that selection, allow a user to select the "+ADD" button to either add to an existing group or to add to a new group. Additionally, it should be appreciated that various tiles can comprise a settings button to allow a user the option of configuring the individual tiles, the type of tile generally (for example, all Aggregator Tiles), or any of the information depicted in the respective tile. In some embodiments, edits to a particular tile (for example, a user selecting a portion of data to analyze or exclude) can automatically be applied similarly to other tiles depicted in the interactive user interface 101. Also, some or all tiles may comprise a toolbar that allows a user to type in or drop down instructions or search strings to further filter or modify the data represented in the tile. Some or all of the tiles may also comprise an icon or indicator 129 that can indicate to the user what type of tile is being depicted.

In some embodiments, a toolbar 103 may be incorporated into the interactive user interface to display information to a user or to facilitate the receiving of instructions from the user by providing buttons and boxes to receive input from a user. For example, in some embodiments, the toolbar can display a location of the saved template 102 that stores a local or remote electronic storage location where the presently loaded interactive user interface template is stored, even if in temporary memory. Also, a title of the template 104 may also be displayed and allow for editing by a user, or block editing if the system requires due to administrator settings, security protocols, or for collaborative reasons (i.e., changing the name or storage location may prevent other collaborators from accessing the file).

In some embodiments, the toolbar 103 may comprise a New Tile Button 110, which is described in more detail in FIG. 2 below, which allows a user to provide information regarding the creation of a new tile. Information may include, for example, what type of tile to create (i.e., Bucketer, Filter, Aggregator, or Comparator), the type and/or style of tile, the data objects to be associated with the tile (e.g., data objects 1-100, groups of data objects (e.g., in a comparator tile), or the entire loaded data set or data source), various tools appearing on the tile, what content (i.e., column) to include on the axes, the scales of the axes, a name of the tile, how to present the data (e.g., number of columns, aggregation rules, order, null values, format, etc.), or any other relevant formatting rules. In some embodiments, for a Comparator Tile, a user can input data for 2 or more groups of data to compare against each other. For example, a user can select a first group of data objects and the system can classify that first group as Group 1 and the remaining unselected data objects as a second group, e.g., Group 2. Also, in some embodiments, the user can optionally show or hide the total number of data objects in each group on the rendered tile. In some embodiments, for an Aggregator Tile, a user can program an aggregate function (e.g., summation, average, etc.), input a label of the tile, provide a format for the number (e.g., how many decimal places or with any currency denomination) or text (e.g., font size or style) on how it should be displayed in the rendered tile.

In some embodiments, the toolbar 103 may comprise a Generate Tiles Button 104 that allows a user to automatically update or generate the displayed tiles. In some embodiments, the Generate Tiles Button 112 may create histogram tiles for each column of a particular data set so that a user can instantly see and interact with a variety of charts. In some embodiments, the Generate Tiles Button 112 allows a user that may have automatic updating of tiles turned off or disabled configure how one or more tiles are generated. In some embodiments, selecting the button 112 can automatically run an algorithm to reset the tiles to default settings. In some embodiments, selecting the button 112 can update some or all of the tiles based on one or more selections of data the user highlights or selects from the data object table 146. For example, a user can select one or more rows of data objects in the table 146 and then select the generate tiles button 112 to load in the selected data objects into the interactive user interface by updating the displayed tiles or generating new tiles based on the selected data and/or any pre-configured settings.

In some embodiments an Auto Layout Button 114 may allow a user to select a default layout on how to view the tiles. For example, the user can view tiles in a grid format (as shown), the grid may comprise large tiles, small tiles, and/or various ordering of the tiles based on type, data, or preference. In some embodiments, for the small grid or large grid, the system may format the tiles differently so that data is displayed in a format that is based partly on the size of the tile. For example, the small grid may have an x-axis or y-axis with fewer steps or a more compressed scale. In some embodiments, a user can customize a size of each tile, or individual tiles. For example, one tile can be set to take the space of two other tiles if the user wishes to display more information or details on the x-axis or y-axis of a chart on a tile.

In some embodiments, a user can use the Search Box or Button 116 to search through data and the tiles.

In some embodiments, a user can use the Prefilter Button 118 that allows a user to filter data by adding conditions prior to importing any data. Before loading all data into the browser, the prefilter setting can allow a user to take only a slice or subset of the data to load into the browser based on relevancy or pertinence to a particular job. This is advantageous because it allows a user to limit the amount of data loaded into the browser, which may have memory limitations that the user can avoid by loading less data. For example, some browsers may have limits of 1-2 gigabytes of data before more data cannot be added, thus optimizing imported data would be advantageous with larger sets of data. In some embodiments, the prefiltering can be performed through parameter values provided through URL and with a sample template. In some embodiments, prefilter settings can be saved in a template as described herein.

In some embodiments, a user can use the Load Data Button 120 that allows a user to load particular sources of data objects into the interactive user interface. For example, where the interface is loaded in a browser application, the data would be loaded into memory to be accessed by the browser. In some embodiments, a user can query data from a particular server or servers. In some embodiments, a user can link or connect the interactive user interface to a designated server to have convenient and easy access to data.

In some embodiments, a user can use the Enrich Button 122 to introduce a new data set into the interactive user interface. For example, in some embodiments, the data can be added into the table 146 as new data objects or be introduced as new columns to the originally loaded data set to augment the data objects with new information. For example, with respect to a shipment example, enriching data can be related to the customer associated with a particular data object for each data object. So, a customer referred to by a number in the originally loaded data set can be associated with an actual name based on another data set that has the customer numbers and associated customer names available. The enriching data can also comprise one or more buckets that were previously prepared and saved, in some implementations. Additionally, in some embodiments, the buckets, or new columns, can be added to the left or right of any particular column in the data set, as shown in table 146.

In some embodiments, a user can use the Select Template Button 124 to load a preconfigured or previously saved template in the current interactive user interface. In some embodiments, one or more templates may be limited to particular data sets. In some embodiments templates can be applied to any data set.

In some embodiments, a user can use the edit button 126 to view or modify settings of the interactive user interface. In some embodiments, users may have access to the template editor interface depicted in FIG. 4, for example, or a session editor. The template editor and session editor are described in more detail below.

In some embodiments, a user can use share button 106 to share a template, programmed buckets, or data, with other users in an organization. A user can also use save button 108 to save the template, programmed buckets, or data for user at a later time or to share with other users in an organization at a later time. For example, in some embodiments, a user can filter out irrelevant data, add one or more buckets (i.e., columns) of data to a data set, reorient various tiles, or make other changes to the interactive user interface. All the changes, or the current view, can be saved with the save button 108 so that a user, or another user, can access, view, and continue work on the same template or current view.

In some embodiments, the Aggregator Tiles 128 and 130 can render a single value computed over a given column of data across a filter set. In some embodiments, Aggregators, or Aggregator Tiles 128 and 130, can update with each filtering interaction by a user. A filtering interaction may include user initiated instructions for the system to exclude a portion of data loaded from the source data. In some embodiments, filtering can be done automatically by the system or as prompted by a user, administrator, group. Aggregators can be used by users to monitor sums or averages over certain columns of data while actively filtering the dataset. For example, a user analyzing and filtering stock purchases and sales can track an average transaction value across a currently filtered set of transactions.

Example Aggregator Tile 128 depicts an aggregate number of shipments. The number of shipments is based on selected data, or selected data objects, to be analyzed. The system would analyze the selected data and determine the total number of shipments by counting the shipments. Example Aggregator Tile 130 depicts a total weight of all shipments for the selected data, or selected data objects. It should be appreciated that various results can be calculated by Aggregators. For example, Aggregators can calculate total number of data objects, the sum all values in one column for a total, the mean, median, or mode of a set of numbers in a column, or any other analysis over a set of numbers in a column.

In some embodiments, a user can program information or instructions to a designated subset of data, which are referred to as Buckets. Thus, a Bucketer can give a user the ability to define a new column and to assign new values to that column for some or all of the data from one or more data sources. In some embodiments, the Bucketer Tile 138 can render a filter (a table with rows acting as filters, for example) and add to the filter with actions displayed on a portion of the tile, for example on the bottom of the tile. The actions may comprise adding different types of data or instructions to an intended set of data. Once values are assigned to the new column, the associated filter can be used just like the Filter Tiles 134 and 136 to filter the data by the values in the Bucketer column. Bucketers can be pre-configured with values to choose from when assigning, or new values can be created by a user. In some embodiments, users can use Bucketers for tasks like dividing the data into two or more different buckets, or for flagging certain items for review. For example, a user can filter source data related to purses to the most expensive purses and mark the resulting list as high-value.

Example Filter Tile with Comparator 132 depicts two groups of data (for example, as selected by Comparator Tile 140 as described below) compared in a graph representing shipment size. The designations are "Full," representing a full shipment, "Half," representing a half shipment (or near-half shipment based on a given threshold), and "Oversize," representing oversized shipments. The oversized shipments may comprise shipments over a given weight threshold, number of packages threshold, or the like.

In some embodiments, Comparators, which is represented in the Comparator Tile 140, allows a user to define mutually exclusive subsets of data and compare the subsets across all other tiles presented on an interactive user interface. Comparators can be used for monitoring how histograms and distributions differ between two distinct subsets of data. For example, a user can monitor a first time period as compared to a second time period, a first category as compared to a second category, etc. In Tile 140, in some embodiments, a user can select one of the groups to view the data objects in that group, for example, in Table 146. It should be appreciated that although a group in the Comparator Tile 140 can comprise a bucket, as described herein, the Comparator Tile 140 can also create groups that are not a bucket. The difference between a comparator group and a bucket is that a bucket is saved alongside the data for the data objects, and the comparator group is not necessarily saved as a column unless it is also a bucket.

Example Comparator Tile 140 depicts two selected groups entitled "Group1" and "Group2." The Tile 140 shows 503 data objects are associated with Group 1 and 125 data objects are associated with Group2. The Tile 140 allows a user to add more data objects to each of the groups and to add additional groups to the Tile 140. In some embodiments, as groups get added or removed from the system, as depicted in Tile 140, for example, the other tiles in the interactive user interface may be updated accordingly to depict the groups. For example, automatically created groups or groupings of data may be replaced by the user-designated groups. In another example, tiles that display comparisons between the groupings (for example, Filter Tile with Comparator 132) may be emphasized by the system by being rendered, if the tiles were not already displayed, and/or placed in more suitable locations. A suitable location can be based on usual locations a user may focus on more frequently or view first (e.g., near the top of the screen or top-left of the screen depending on the user or other factors).

Finally, a user can add a new tile in a number of ways. For example, a user can select the New Tile Tile 142 or the New Tile Button 110 to open a dialog box or window to input settings for the new tile. In another embodiment, adding a new tile may automatically create a tile and render it on the interactive user interface, and a user can enter instructions regarding the format, type, and associated data of the new tile into the tile directly.

In some embodiments, Filter Tiles 134 and 136 can render a histogram for a given column of data as a bar chart showing a number of frequent values, a table showing some or all values, or through any other visualization of data. In some embodiments, the system can use software libraries to assist with the filtering and visualizations. For example, the system can use a charting library to generate charts and user interface mechanisms, such as to add filters. For example, the library might allow a user to load in tabular data as dimensions (i.e., columns), then call one or more filter functions on a dimension to filter down to a set of data that matches the aggregate filters across all dimensions.

Example Filter Tile 134 depicts the destination cities of the selected shipments. Further, the listed destinations are ordered from most frequent to least frequent destination city. In some embodiments, the lists can include a limited number of items, a number of items satisfying a threshold, or any other way to limit the information in the tile can be implemented. In some tiles, such as Filter Tile 134, data may not be able to be presented in the space reserved for the particular tile. It should be noted that a scroll bar may be used to display additional data in a tile that may not otherwise fit in the tile.

Example Filter Tile 136 depicted various weights of shipments or groups of shipments. In some embodiments, data can be hidden or displayed on tiles based at least partly on any of the following: pre-configured or automated user, group, and administrator settings. For example, a user can select a scale from zero to one hundred for a certain type of data or column of data. Alternatively, or in combination with a user selected scale (or other pre-configured setting), some portions of the scale can be pre-configured (e.g., the distance between each step of a scale) and other portions can be calculated automatically (e.g., maximum value in the scale) based on the data presented. In some embodiments, override or preference procedures may be necessary in case of a conflict in instructions, or if the data would not otherwise fit on the tile, graph, or chart. For example, the system may default to automatic scaling or formatting if a user's pre-configured instructions conflict with the data or with how the data would otherwise be represented in the tile.

Additionally, in Filter Tile 136, or other tiles, a user can select a portion of data to automatically update Filter Tile 136 and other tiles. For example, a user can select the bars associated with numbers 3 and 4 on the x-axis. This action would cause the updating of the present tile, Filter Tile 136, to depict only the information related to numbers 3 and 4 and overlaid on an updated y-axis scale (if needed). Also, the grouping may also be updated, wherein the data represented as numbers 3 and 4 in FIG. 1 may be expanded into several groupings or clusters and described differently (3 and 4 may be views as 3A, 3B, 4A, and 4B, for example). In some embodiments, the system may then propagate updates through some or all of the remaining tiles, or other tiles (i.e., tiles that are not being interacted with by a user). For example, Tile 130 may be updated to reflect a new weight of the selected data objects, and Tile 128 may be updated to reflect a new total number of shipments.

In some embodiments, some or all of the other tiles may not be updated automatically by updating one of the tiles, and some or all of the other tiles may be configured to be static by content or location, meaning that some or all of the tiles either remain in the same location on the interface or contain the same information that persists through one or more updates to the tiles. In some embodiments, upon selecting data or data objects in one tile or otherwise updating one tile, would not only update some or all of the other tiles with respect to content displayed and various changes to the chart or graph scaling as described herein, but may also affect the placement of the various tiles. Also, in some embodiments, upon updating one tile, the location of some or all of the tiles may also be updated based on priority (either preconfigured or calculated automatically based on preconfigured criteria), importance to the user or task, relevance to the user or task, amount changed (i.e., how much the tile changed in appearance), or the like. Additionally, in some embodiments selections of data or data objects can affect how the tiles display groups of data. For example, tiles may group sets of data based on similarities or if the data is within particular ranges. One advantage of the groupings is that more information can be displayed on a tile, which may have limited space. Another advantage is that grouping such data objects may allow a user to make determinations more efficiently or more quickly in some situations. In some embodiments, groupings may change based on what data is selected and how the various tiles are configures. In some embodiments, groupings can remain persistent through various updates to the tiles or with varying selections of data. The changing or persistence of views of the tiles can be based on user, group, administrator settings, or the system can make such a determination automatically.

Example Bucketer Tile 138 depicts a recommendation assigned to various shipment data objects. In some embodiments, a user can create a new column, or bucket, and add data that is to be associated with various data objects. For example, in Tile 138, a Recommendation column was created and a user assigned values of "Hold" and "Ship" for 158 data objects. In some embodiments, data objects with no value assigned can be displayed in the Tile 138 with an indication that no value was assigned, or alternatively, the data objects with no value assigned can be hidden in Tile 138. Any display or non-display of data on any tile can be programmed automatically by the system, manually by a user or administrator, or by any other similar means. The decisions made by a user, as represented by the data input into the new column, can be saved with the original data source or transmitted to various users to aid in collaboration and prevent duplicative or contradictory work. In some embodiments, the system may provide suggestions to a user to create a new bucket or column based on the data objects loaded into memory and/or the selected data objects.

In some embodiments, a table 146 displays some or all of source data objects being analyzed by the system. A user may show or hide the table with a button 154. In some embodiments, a user may program how the data objects are displayed, what columns associated with the data objects are displayed and in what order, and what data objects are displayed and in what order, style, or font. In some embodiments, a number may be displayed showing how many rows of data objects are in the source data and/or how many data objects are being displayed in the table 146. In some embodiments, a user can select portions of the data objects to automatically update one or more of the tiles (e.g., Tiles 128, 130, 132, 134, 136, 138, 140, and/or 142). In some embodiments, by selecting data, the system can automatically create one or more new tiles and render the tiles in the interactive user interface in any particular order and/or size. In some embodiments, a user can edit the data directly in the table 146, which may update the tiles as well. In some embodiments, a user can save or export the table into a number of formats (e.g., xls, xlsx, PDF, csv, TXT, or other file types). Additionally, in some embodiments, a user can save the table in the same format it was loaded into memory to generate the interactive user interface. In some embodiments, the data that is loaded into memory to be run on a browser can comprise a BLOB (binary large object) file. In some embodiments, a user can export 148 the template, data, filters, or settings into other software for use by the user or other users. In some embodiments, it may be advantageous to prevent edits to the source data by a user and either prevents any and all amendments, or creates a new copy of the data represented in the table 146 so that a user can edit the new copy and leave the original data source unchanged. Leaving the original data source unchanged may be advantageous to prevent loss of data and otherwise keep the data secure but accessible to a large array of device and/or people.

Figure 2:
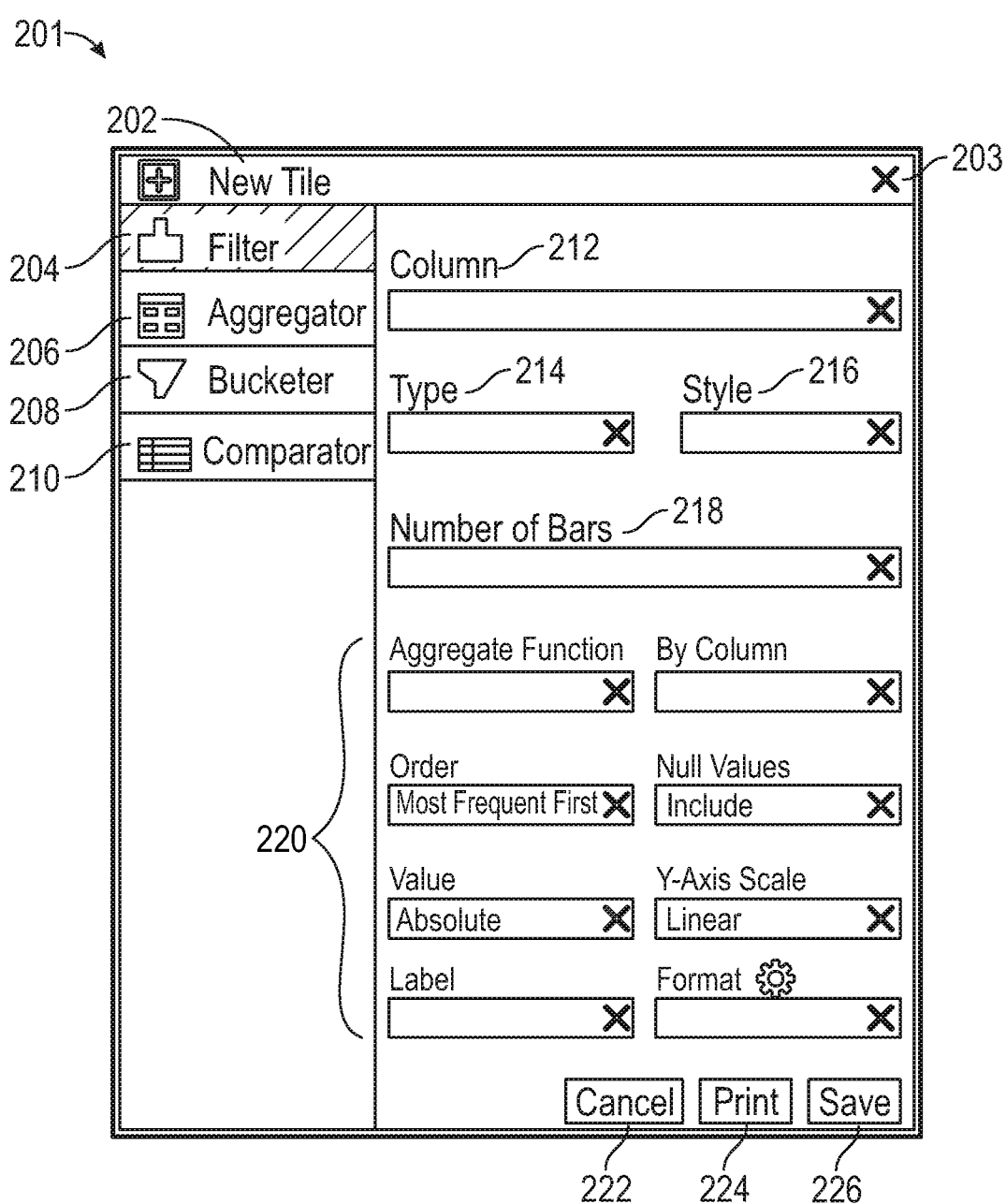
FIG. 2 illustrates an embodiment of an interactive user interface depicting options for adding a new tile to the interactive user interface of FIG. 1.

FIG. 2 illustrates an embodiment of a graphical settings user interface 201 depicting options for adding a new tile to the interactive user interface of FIG. 1. The settings user interface 201 can be used for creating a new tile, as indicated by the title 202. The settings user interface 201 allows a user to provide information regarding the creation of a new filter tile. The interface can be accessed by selected the New Tile button 110 or New Tile Tile 142 in FIG. 1, for example. As depicted, the Filter 204 tile settings are currently selected. However, a user can also select Aggregator 206, Bucketer 208, or Comparator 210 to create a new tile for each of the respective types. For the filter tile 204, a user can enter information regarding which column 212 of the data objects to filter based on. For example, a dropdown list or text box where a user can type can take information from a user designating a particular column in the imported or loaded data set(s) to filter with. A user can also designate the type 214 style 216 of the filter tile. A user can choose the number of bars 218 to render in the filter tile, which may automatically group sets of data in such a way as to fit in the designated number of bars. Chart settings 220 provide further refinement of how the new filter tile renders. A user can also be provided the options to cancel 222 the new tile, print 224 the results of the tile or settings for future use, or save the settings to automatically render the new tile. In some embodiments, the system may automatically update one or more of the other tiles (if any exist) upon the creation of the new tile based on the settings and/or data/column selected. For example, if a particular type 214 or style 216 is selected, then all tiles may be updated to conform to the type and/or style specified to look aesthetically consistent.

Further, as stated above, a user may provide information what type of tile to create (i.e., Filter 204, Aggregator 206, Bucketer 208, or Comparator 210), the type and/or style of the tile, the data objects to be associated with the tile (e.g., data objects 1-100, groups of data objects (e.g., in a comparator tile), or the entire loaded data set or data source), various tools appearing on the tile, what content (i.e., column) to include on the axes, the scales of the axes, a name of the tile, how to present the data (e.g., number of columns, aggregation rules, order, null values, format, etc.), or any other relevant formatting rules. In some embodiments, for a Comparator Tile, a user can input data for 2 or more groups of data to compare against each other. Also, in some embodiments, the user can optionally show or hide the total number of data objects in each group on the rendered tile. In some embodiments, for an Aggregator Tile, a user can program an aggregate function (e.g., summation, average, etc.), input a label of the tile, provide a format for the number (e.g., how many decimal places or with any currency denomination) or text (e.g., font size or style) on how it should be displayed in the rendered tile.

Figure 3:
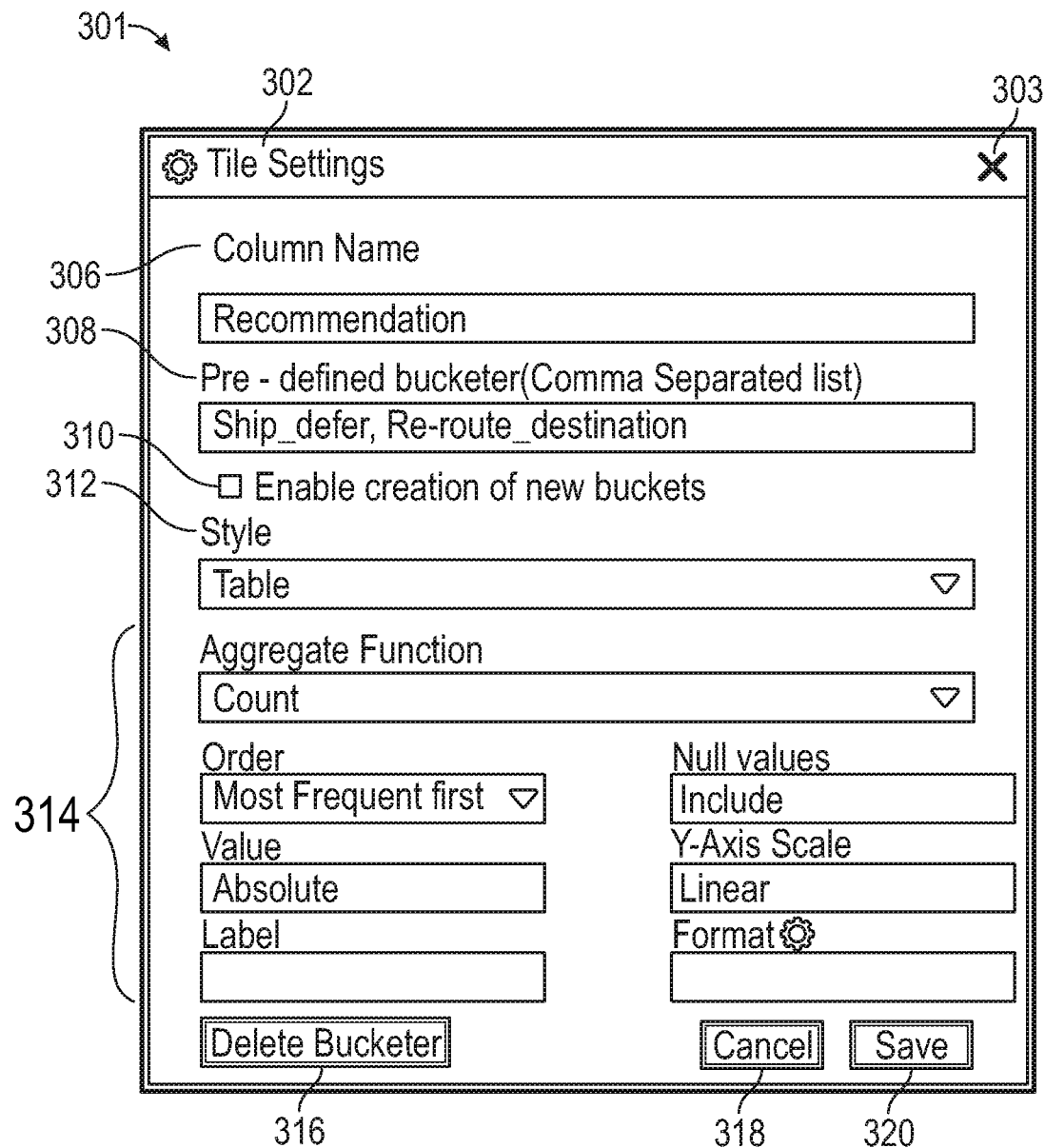
FIG. 3 illustrates an embodiment of an interactive user interface depicting settings for modifying one or more tiles of the interactive user interface of FIG. 1.

FIG. 3. illustrates an embodiment of a tile settings user interface 301 showing settings for modifying one or more tiles of the interactive user interface of FIG. 1. The tile settings user interface 301 allows a user to program a Bucketer Tile. A rendered version of the Bucketer Tile 138, which appears in FIG. 1, is similar to what the result of FIG. 3 would look like. This interface can be accessed by selecting the gear or edit icon, which an example is depicted in the top right of the Bucketer Tile 138 in FIG. 1. In some embodiments, a column name 306 can be provided as a name for the column or bucket. Pre-defined buckets 308 can be displayed in the tile as either the bucket name or a different name. In some embodiments, providing a bucket name that may not exist can create a new bucket, for example, by selecting the toggle 310. Additionally, style 312 and other formatting instruction 314 can be provided prior to rendering the tile. In some embodiments, if one or more settings are left blank, the system can automatically assign each setting a value. Also, a user can delete the tile 316, cancel the change 318, or save and render the updated tile 320. It should be appreciated that similar settings related to the Bucketer Tile (e.g., title, layout, format, label, style, or the like) may be provided for other tile types as well.

Figure 4:
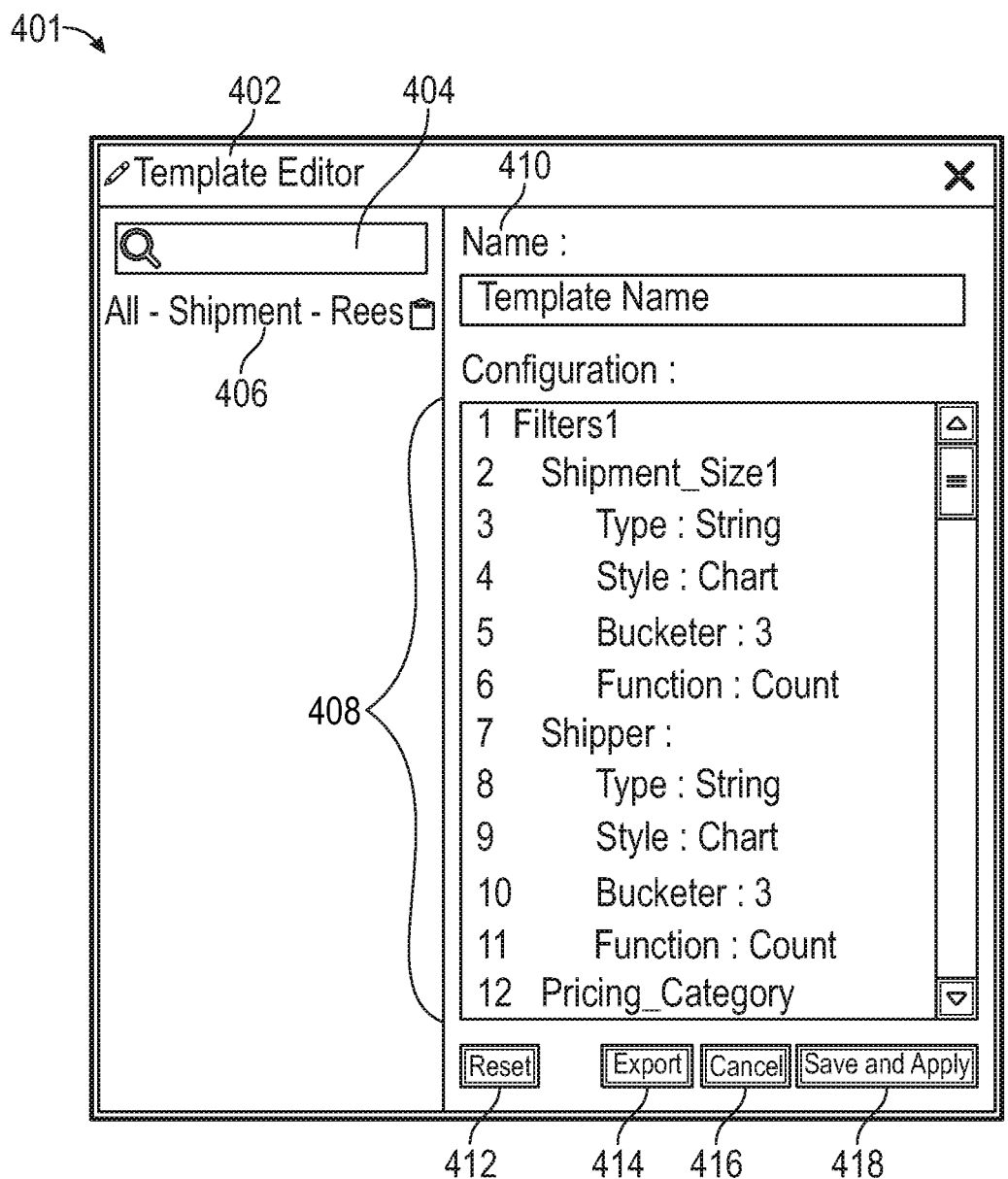
FIG. 4 illustrates an embodiment of an interactive user interface depicting a template editor that allows a user to edit elements of the interactive user interface of FIG. 1.

FIG. 4 illustrates an embodiment of an interactive user interface depicting a template editor interface 401 that allows a user to edit elements of the interactive user interface of FIG. 1. In some embodiments, a user can access this screen by selecting the edit button 126, for example. The template editor interface 401 allows a user to view or modify code associated with the interactive user interface 101. In some embodiments, the code can be in the YAML programming language. In some embodiments, configuration file formats other than YAML can be used, for example: JSON, XML, JavaScript, C, Email, PHP, Python, Perl, and/or others. The user can view the configuration window 408 and see settings for various tiles and data formatting, and then modify the coding. A title 402 can indicate to the user what interface they are viewing. The user can also reset the defaults 412 of the template configuration, export the template 414 in a number of file formats that may be proprietary or traditional (e.g., XLS, PDF, CSV, TXT, or other file types). A user can search for various tiles or data objects by using the search bar 404. A list of prior search results can also be shown displaying a history of searches. For example, a prior search 406 can be selected by a user to display the corresponding results in the configuration window 408, or in a new interface. Additionally, a session editor can similarly be used by a user to view and edit the template configuration code (e.g., a YAML file). The session editor may be displayed if a template has not been created yet when a user attempts to view the template editor interface 401. Additionally, editing the YAML file through a session editor, for example, can display updates to the interactive user interface in real time. In some embodiments, configuration file formats other than YAML can be used, for example: JSON, XML, JavaScript, C, Email, PHP, Python, Perl, and/or others.

It should be appreciated that the template editor interface 401 may allow a user more customizability than a traditional graphical user interface, or more efficient customization changes. A group or administrator setting may prevent particular changes to the template via the user interfaces (e.g., interface 101), but allow more advanced users access to the template editor interface 401, and/or the ability to change more settings of the template within the template editor interface 401.

In some embodiments, an alert and/or notification is automatically transmitted to a device operated by one or more users. The alert and/or notification may be used to notify one or more users that a particular data object, data set, or template has been opened or modified in any way. The alert and/or notification can be transmitted at the time that the alert and/or notification is generated or at some determined time after generation of the alert and/or notification.

When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is turned off or otherwise offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 5:
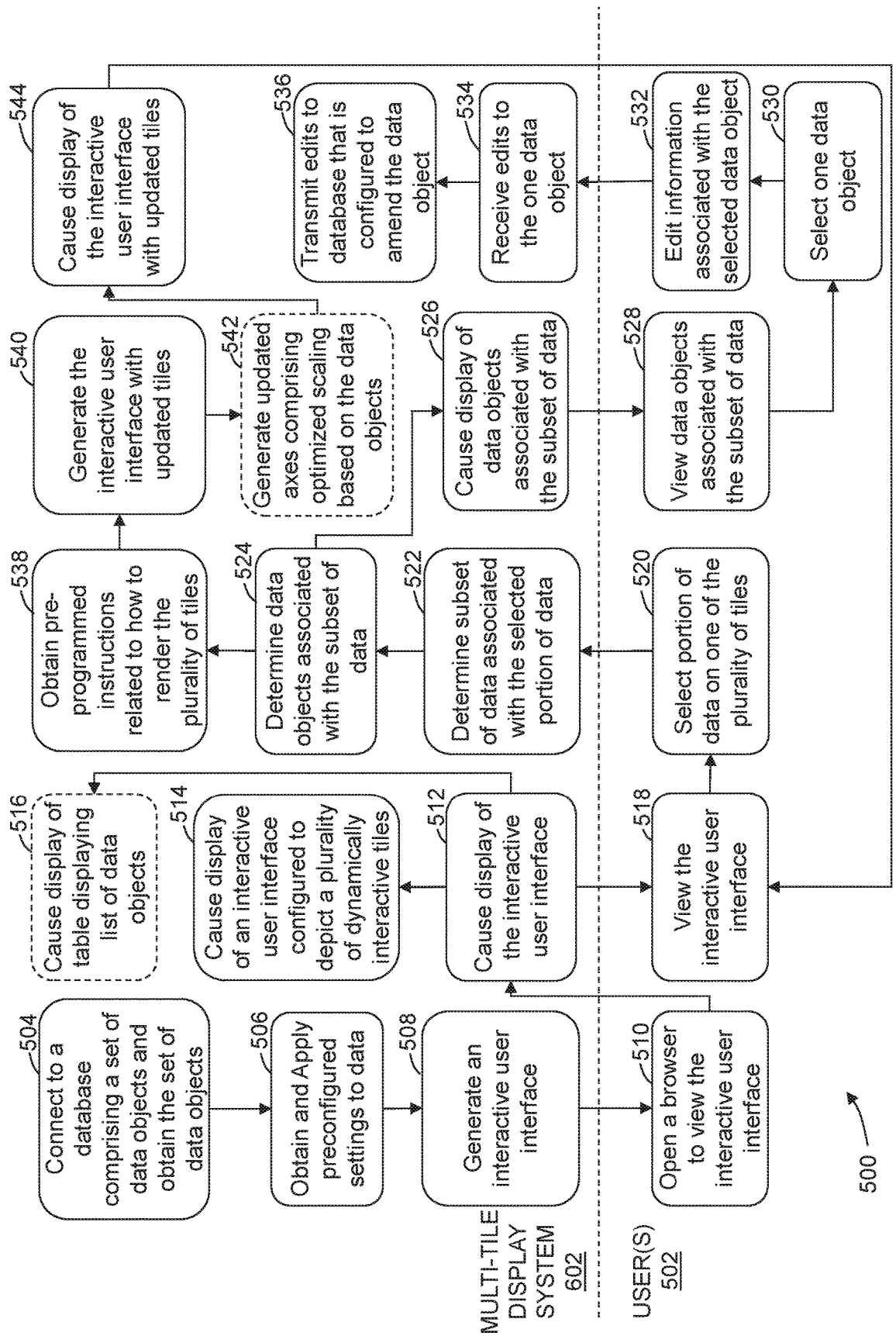
FIG. 5 illustrates a flow chart diagram illustrating functionality of the system related to dynamically updating the interactive user interface and updating data object(s), according to various embodiments of the present disclosure.

FIG. 5 illustrates an example flow chart diagram 500 illustrating functionality of the system related to dynamically updating the interactive user interface and updating data object(s), according to various embodiments of the present disclosure. However, it should be appreciated that many variations and modifications may be made to the embodiments described herein and in this figure, the elements of which are to be understood as being among other acceptable examples. All such modifications and variations are intended to be included herein within the scope of this disclosure. Also, all steps and blocks should be interpreted to be acceptable in no particular order, except where the system or method would not function for its intended purpose. One or more of the blocks described may be optional in certain implementations.

In block 504, the multi-tile display system 602 connects to a database. The database may include a set of data objects as described herein. Then multi-tile display system 602 then obtains the data. In some embodiments, the multi-tile display system 602 can connect to more than one database and can obtain more than one sets of data objects. Also, the multi-tile display system 602 may the same computer system 700 described in FIG. 7 or the multi-tile display system 602 described in FIG. 6. In some embodiments, the data obtained and the database(s) connected to can be configured or requested by a user or administrator.

In block 506, the multi-tile display system 602 obtains and applies any preconfigured user, group, tile, or template settings to the interactive user interface. In some embodiments, a user can select or dictate which settings do apply and which the system should prefer or default to if a conflict arises between two distinct settings. In some embodiments, the user cannot select what settings to apply and the settings may be configured by an administrator or determined automatically based on the obtained data.

In block 508, the multi-tile display system 602 generates an interactive user interface and/or generates user interface data useable for rendering as an interactive user interface. In some embodiments, the multi-tile display system 602 may be a remote server, a user's computing device, or have some components on a user's computing device and additional components on a remote server, among other similar configurations. For example, in a typical configuration, relevant data can be loaded onto a browser application installed on a user's computing device. The data can be downloaded from a remote server or from local storage (e.g., hard drive, USB drive, or the like).

In block 510, one or more users 502 may cause to open a browser application to view the interactive user interface, which then, in block 512, may then cause the multi-tile display system 602 to display the interactive user interface on a browser located on the one or more users 502 computing device. In some embodiments, in block 516, the multi-tile display system 602 may also cause display of a table displaying a list of data objects associated with the obtained data from block 504. For example, a table such as the table 146 in FIG. 1 may be caused to be displayed on the interactive user interface.

After block 512, and in no particular order, a user may view the interactive user interface in block 518 and select a portion of data on one of the plurality of tile in block 520. In some embodiments, the user can select data via any part of the interactive user interface, such as the table 146 shown in FIG. 1.

Upon selecting the portion of data, the multi-tile display system 602, in block 522, determines the subset of data associated with the selected portion of data. The multi-tile display system 602, in block 524, may then determine the data objects associated with the subset of data. For example, the subset of data from block 522 may only comprise several (e.g., one, two, three, etc.) columns of data, but not all the data associated with the related data objects. The multi-tile display system 602, in block 524, would then assess, based on the data obtained data set, which data objects are associated with the subset of data and then obtain the said data objects.

The multi-tile display system 602 can then perform two example options. However, it should be appreciated that the multi-tile display system 602 can perform additional tasks not represented in the flow chart diagram 500. A first option is described in blocks 526, 528, 530, 532, 534, and 536, and relates to editing information related to one or more data objects in a data source. A second option is described in blocks 538, 540, 542, and 544, relates to automatically updating a plurality of tiles displayed on the interactive user interface.

For the first option, in block 526, the multi-tile display system 602 causes display of data objects associated with the subset of data, for example in a table like table 146 in FIG. 1. In block 528, one or more users view the data objects. Then in block 530, the one or more users 502 can select one data object, and then edit information associated with the selected data object in block 532.

In block 534, the multi-tile display system 602 receives the edits provided to the multi-tile display system 602 by the one or more users 502. Then in block 536, the multi-tile display system 602 transmits the edits to the database comprising the set of data objects, wherein the database is configured to amend the data objects.

For the second option, in block 538, the multi-tile display system 602 obtains pre-programmed instructions related to how to render the plurality of tiles. Such instructions may include instructions from one or more users 502, a group, administrator, default settings, or the multi-tile display system 602 can automatically determine instructions based on the data objects associated with the subset of data.

In block 540, the multi-tile display system 602 generates the interactive user interface with updated tiles, wherein the updated tiles are based partly on the pre-programmed instructions from block 538 and the data objects from block 524.

In block 542, the multi-tile display system 602 can optionally generate updated axes comprising an optimized scaling based on the data objects from block 524. For example, when a user 502 selects a portion of data in block 520, the user 502 is indicating to the multi-tile display system 602 what data they would like to see in the tile (i.e., the data selected) and what data they do not want to see in the tiles (i.e., the data not selected). Once the data objects are determined in block 524, the multi-tile display system 602 will update a plurality of tiles, which may be some or all of the tiles, to only display information related to the data objects determined in block 524. In some situations, the data objects may not be represented adequately or in an optimized fashion on the tiles if the axes, as they were displayed in block 512, are not adjusted to the smaller subset of data associated with the data objects. Thus, in block 542, the multi-tile display system 602 can generate new axes, or new formatting, for the tiles to optimize the display. In some embodiments, the multi-tile display system 602 can also consider any instructions from 538 that may affect updating the axes in block 542.

In block 544, the multi-tile display system 602 causes display of the updated interactive user interface comprising updated tiles. Finally, a user can view the interactive user interface in block 518 and begin the process over again, if desired, to further filter the data objects represented by the tiles in the interactive user interface.

Figure 6:
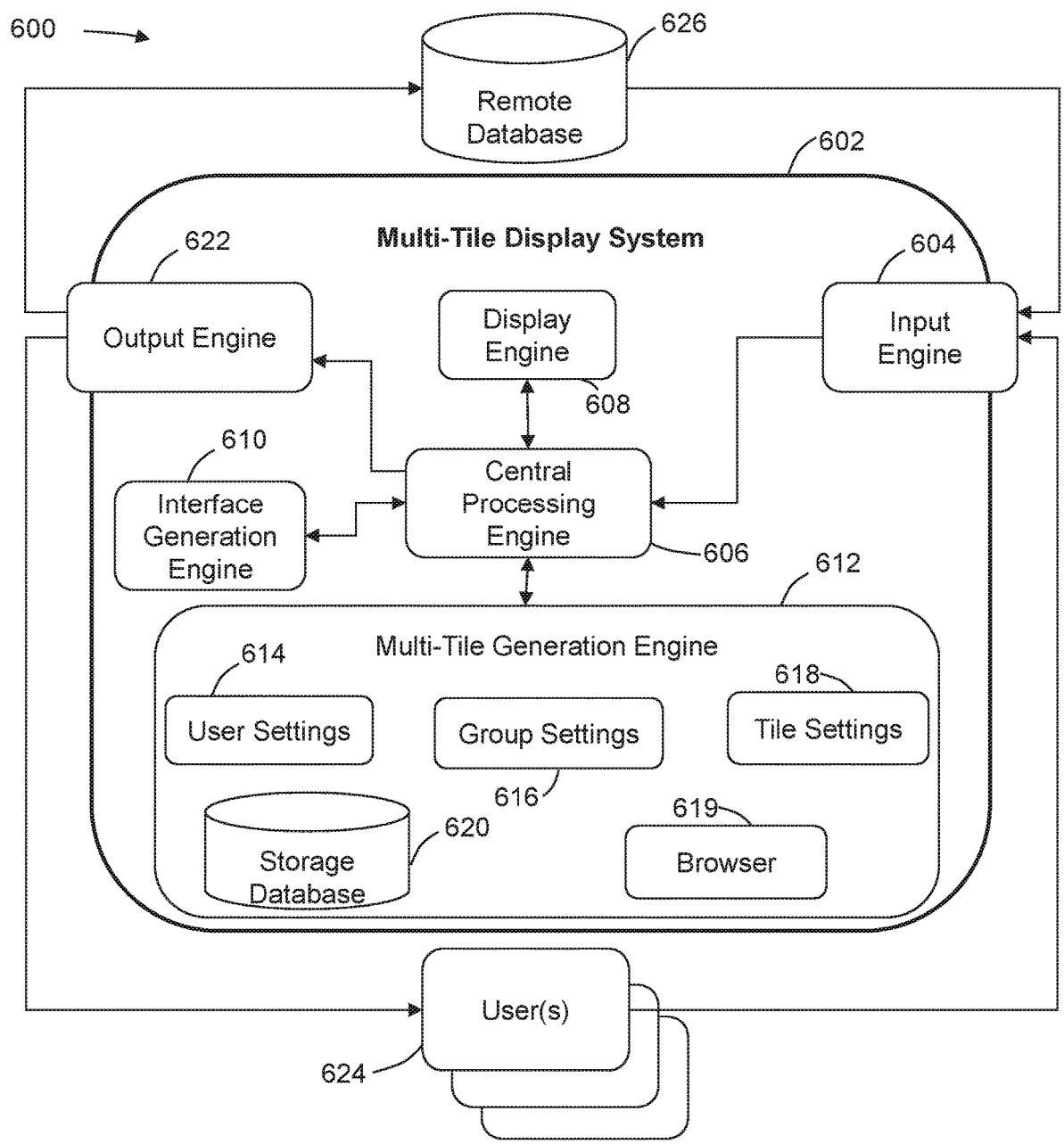
FIG. 6 illustrates an embodiment of a block diagram of a multi-tile display system, also illustrating how the components are in communication with each other.

FIG. 6 illustrates an embodiment of a block diagram of a multi-tile display system 602, also illustrating how the components are in communication with each other. The multi-tile display system 602 may be the same as the multi-tile display system described in FIG. 5 and herein. Also, the multi-tile display system 602 includes many components. The components described herein are not meant to be exhaustive but only a sample of what components may be implemented in a multi-tile display system 602. Some components may be combined and others may be removed or substituted with similar components.

The multi-tile display system 602, as described in FIG. 6, includes an input engine 604, a multi-tile generation engine 966, a central processing engine 606, an interface generation engine 610, a display engine 608, and an output engine 622. The remote database 960 contains data sets with data objects, where each data object is associated with one or more columns of data. Also, the users 624 are the same users as described herein, each user having access to a browser to view an interactive user interface rendered by the multi-tile display system 602. The remote database 626 and the users 624 may communicate with the multi-tile display system 602 over a local area network, the internet, or any other suitable means. The remote database 626 may also be a local network database or a local database in some implementations.

The input engine 604 interfaces with one or more users 624 through a local area network or the internet. Users 624 may provide instruction or information to the multi-tile display system 602. The input engine 604 receives then sends any instructions or information to the central processing engine 606.

The central processing engine 606 receives data and information from the input engine 604 and processes the data depending on the methods described in FIG. 5 and herein, for example. In one embodiment, the central processing engine 606 sends data to a multi-tile generation engine 612, an interface generation engine 610, and a display engine 608. The central processing engine 606 also communicates with the display engine 608, the interface generation engine 610, and the output engine 622.

The multi-tile generation engine 612 includes user settings 614, group settings 616, tile settings 618, a browser 619, and a storage database 620. In some embodiments, certain aspects of the multi-tile generation engine 612 can be performed by a back-end server and other aspects can be performed by a user's computing device. In some embodiments, the computing system can be just the user's computing device or just the back-end server. The user settings 614 can comprise various customizations or preferences a user 624 preconfigured on how the user 624 prefers to view the various tiles and/or data. In some embodiments, the user settings 614 can be based on the user's title or role in a company. The group settings 616 can comprise various customizations or preferences on how the members of a particular group prefer to view the various tiles and/or data. For example, users 624 within a certain department in an organization may be presented with tiles and data that are different from what users 624 in another department are presented with. The tile settings 618 can be based partly on the user settings 614 or group settings 616, but also include any particular preferences for each individual tile, as opposed to instructions or settings pertaining to tiles generally or a type (e.g., Filter Tiles) of tile generally. For example, tile settings 618 may comprise for a particular tile, formats and designs by a user, group, administrator, or the like for a tile to appear in a certain way, present a certain set of data, and/or be located in a certain location on the interactive user interface. In some embodiments, a tile may be configured to remain persistent through any updated to the interface. For example, if a user selects portions of data, as described in more detail in FIG. 5 above, then updates to the remaining tiles would be automatically rendered. However, the persistent tile(s) would not be updated automatically or at all. Additionally, the multi-tile generation engine 612 may comprise a browser 619 for users 624 to view and interact with the interactive user interface. A storage database 620 may also be a component of the multi-tile generation engine 612 and be used to store data sets, or data objects, and pending requests or instructions from a user 624. In some embodiments, the browser 619 may also include the storage database 620. Finally, each determination made by the multi-tile generation engine 612 is transmitted to the central processing engine 606 for eventual rendering and generating an up-to-date interactive user interface.

The interface generation engine 610 creates an interface based on instructions received from the users 624. Such instructions may include instruction on what tiles to create, creating new buckets, and what data the multi-tile display system 602 should obtain from the remote database 626. It should be appreciated that the remote database 626 may comprise a plurality of databases. Also, for example, the interface generation engine 610 can send a request for data objects to the remote database 626, which can then send information to the input engine 604, to be processed by the central processing engine 606, and to then be used in the creation of various tiles in the multi-tile generation engine 612, which will then be used to create an interface by the interface generation engine 610. Upon completion of creating or updating an interactive user interface, the rendered interface is transmitted to the central processing engine 606 to determine any further updating, filtering, or processing of data.

The display engine 608 receives the final instructions from the central processing engine 606 on how to render and display the interactive user interface (for example, interactive user interface 101 in FIG. 1) for each user 624. The display engine 608 outputs customized information to the user 624 for viewing and interacting with.

In an implementation the multi-tile display system 602 (or one or more aspects of the multi-tile display system 602) may comprise, or be implemented in, a "virtual computing environment". As used herein, the term "virtual computing environment" should be construed broadly to include, for example, computer readable program instructions executed by one or more processors (e.g., as described below in the example of FIG. 7) to implement one or more aspects of the modules and/or functionality described herein. Further, in this implementation, one or more modules or engines (e.g., input engine 604, output engine 622, interface generation engine 610, display engine 608, central processing engine 606, and/or multi-tile generation engine 612) of the multi-tile display system 602 may be understood as comprising one or more rules engines of the virtual computing environment that, in response to inputs received by the virtual computing environment, execute rules and/or other program instructions to modify operation of the virtual computing environment. For example, a request received from the user(s) 624 may be understood as modifying operation of the virtual computing environment to cause the multi-tile generation engine 612 to generate one or more tiles for display on an interface, the interface generation engine 610 to generate an interface, the display engine 608 to display the interface, and the output engine 622 to transmit the rendered interface back to the user(s). Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by input engine 604 from the remote database 626. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the multi-tile display system 602 as a virtual computing environment may advantageously enable executing different aspects or modules of the system on different computing devices or processors, which may increase the scalability of the system. Implementing one or more aspects of the multi-tile display system 602 as a virtual computing environment may further advantageously enable sandboxing various aspects, data, or modules of the system from one another, which may increase security of the system by preventing, e.g., malicious intrusion into the system from spreading. Implementing one or more aspects of the multi-tile display system 602 as a virtual computing environment may further advantageously enable parallel execution of various aspects or modules of the system, which may increase the scalability of the system. Implementing one or more aspects of the multi-tile display system 602 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

It should be appreciated that the above system and methods can apply to varying use cases. For example, shipments of freight to determine how to route freight based on shipping and storage facilities available or to organize and review the freight or contents of the freight, among other things as further described above. Another use case would be for manufacturing so that during quality control, a person can review any tracked or reported issues (during use or manufacturing) based on any correlated manufacturing conditions (e.g., root-cause analysis). These use cases are not exhaustive and are meant to merely provide a few examples. A person of ordinary skill in the art may find other applicable use cases for the systems and methods described.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
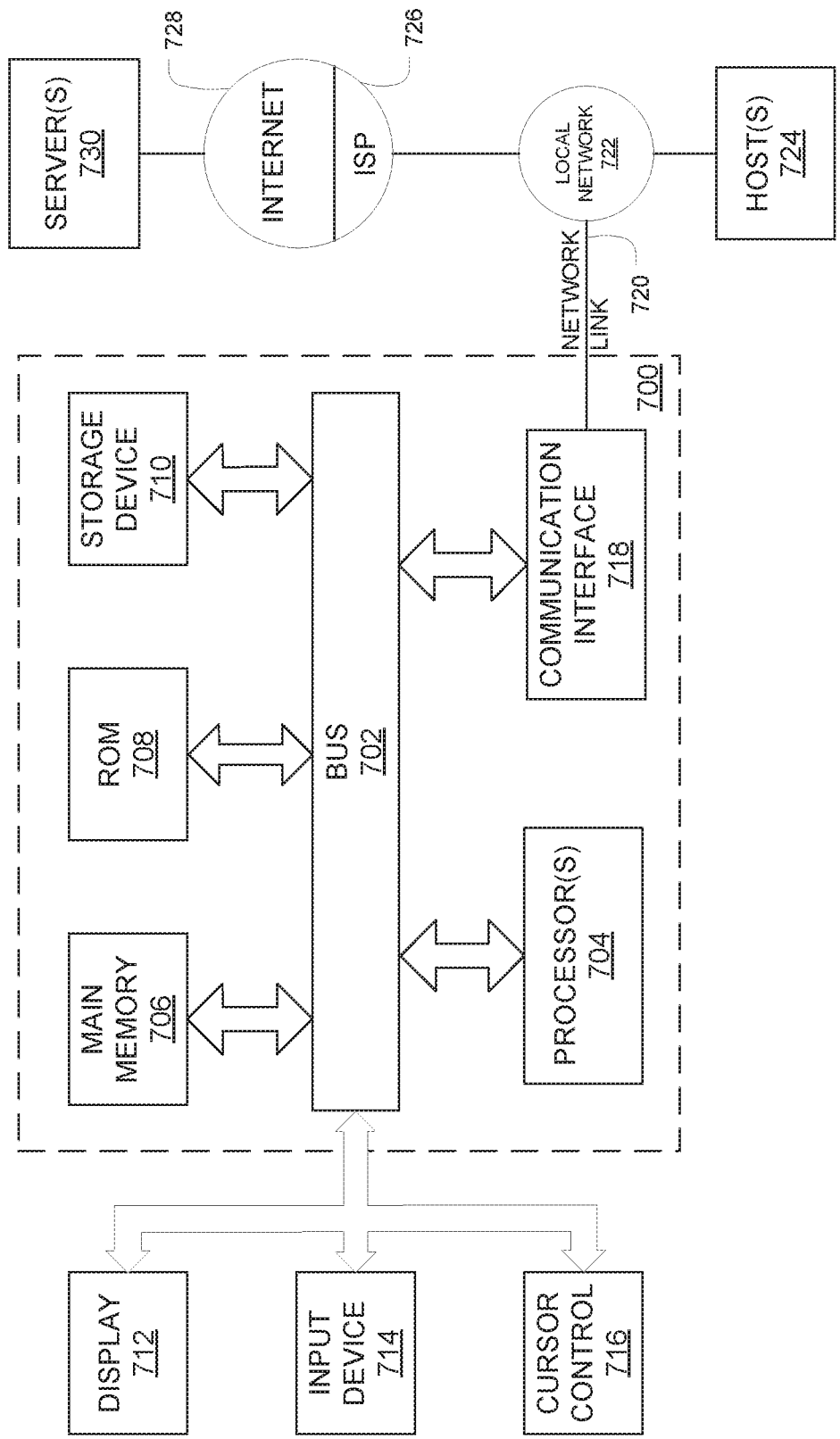
FIG. 7 illustrates a computer system with which certain methods discussed herein may be implemented.

For example, FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors. In some embodiments, the computing system 700 can be comprise certain aspects that are performed by a back-end server, and other aspects that are performed by a user's computing device. In some embodiments, the computing system can be just the user's computing device or just the back-end server. For example, in a typical configuration, relevant data can be loaded onto a browser application installed on a user's computing device. The data can be downloaded from a remote server or from local storage (e.g., hard drive, usb, or the like).

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for dynamically generating an interactive user interface, the computer-implemented method comprising:

by one or more processors executing program instructions:

accessing data from an electronic database, wherein the data are represented by a plurality of data objects comprising multiple data attributes;

generating an interactive user interface for interacting with the plurality of data objects, wherein the interactive user interface comprises a plurality of tiles configured to display information associated with various data attributes of the plurality of data objects, and wherein at least one of the plurality of tiles is configured to receive a selection of a portion of the tile;

receiving, electronically via the interactive user interface, a selection of a portion of the at least one of the plurality of tiles; and responsive to receiving the selection of the portion of the at least one of the plurality of tiles:

determining a subset of the plurality of data objects represented by the selected portion, wherein the subset of the plurality of data objects includes fewer data objects than the plurality of data objects; and adjusting, in the interactive user interface, the plurality of tiles to display information associated with the subset of the plurality of data objects.

2. The computer-implemented method of claim 1, wherein one tile of the plurality of tiles depicts a visualization of data based at least partly on the plurality of data objects.

3. The computer-implemented method of claim 2, wherein the selection is based at least partly on a selection of a portion of the visualization of data.

4. The computer-implemented method of claim 3, wherein the visualization of data is one of the following: graphical or textual.

5. The computer-implemented method of claim 1, further comprising:

by the one or more processors executing program instructions:

responsive to receiving the selection of the portion of the at least one of the plurality of tiles, adjusting, in the interactive user interface, the scale shown on the plurality of tiles to display information associated with the subset of the plurality of data objects in an automatically optimized format.

6. The computer-implemented method of claim 1, wherein a current layout of the interactive user interface can be saved in a compatible file format.

7. The computer-implemented method of claim 1, wherein the interactive user interface is displayed based at least partly on inputs into a session editor.

8. The computer-implemented method of claim 1, wherein the plurality of tiles comprises visual representations as one or more of: a number, a bar graph, a list, a scatter plot, and a bar graph overlaid on a scatter plot.

9. The computer-implemented method of claim 1, wherein the plurality of tiles comprises a filter tile depicting a histogram as a bar chart based at least partly on data associated with at least some of the plurality of data objects.

10. The computer-implemented method of claim 1, wherein the plurality of tiles comprises an aggregator tile depicting a single value based at least partly on the subset of the plurality of data objects.

11. The computer-implemented method of claim 1, wherein the plurality of tiles comprises a comparator tile depicting data related to at least two exclusive subsets of the plurality of data objects.

12. The computer-implemented method of claim 11, further comprising:

by the one or more processors executing program instructions:

responsive to receiving the updated data, updating the electronic database with the updated data.

13. The computer-implemented method of claim 11, further comprising:

by the one or more processors executing program instructions:

responsive to receiving the updated data, notifying one or more users of the update.

14. The computer-implemented method of claim 1, further comprising:

by the one or more processors executing program instructions:

receiving, electronically via the interactive user interface, updated data associated with one or more of the data objects; and responsive to receiving the updated data, updating the subset of the plurality of data objects to display information associated with the updated data.

15. A system for dynamically generating an interactive user interface, the system comprising:

a computer readable storage medium having program instructions embodied therewith; and one or more processors configured to execute the program instructions to cause the system to:

access data from an electronic database, wherein the data are represented by a plurality of data objects comprising multiple data attributes;

generate an interactive user interface for interacting with the plurality of data objects, wherein the interactive user interface comprises a plurality of tiles configured to display information associated with various data attributes of the plurality of data objects, and wherein at least one of the plurality of tiles is configured to receive a selection of a portion of the tile;

receive, electronically via the interactive user interface, a selection of a portion of the at least one of the plurality of tiles; and responsive to receiving the selection of the portion of the at least one of the plurality of tiles:

determine a subset of the plurality of data objects represented by the selected portion, wherein the subset of the plurality of data objects includes fewer data objects than the plurality of data objects; and adjust, in the interactive user interface, the plurality of tiles to display information associated with the subset of the plurality of data objects.

16. The system of claim 15, wherein one tile of the plurality of tiles depicts a visualization of data based at least partly on the plurality of data objects.

17. The system of claim 16, wherein the selection is based at least partly on a selection of a portion of the visualization of data.

18. The system of claim 17, wherein the visualization of data is one of the following: graphical or textual.

19. The system of claim 15, wherein the system is further configured to:

responsive to receiving the selection of the portion of the at least one of the plurality of tiles, adjust, in the interactive user interface, the scale shown on the plurality of tiles to display information associated with the subset of the plurality of data objects in an automatically optimized format.

20. The system of claim 15, wherein the plurality of tiles comprises visual representations as one or more: a number, a bar graph, a list, a scatter plot, and a bar graph overlaid on a scatter plot.

* * * * *